(12) United States Patent
Oswald et al.

(10) Patent No.: US 7,292,015 B2
(45) Date of Patent: Nov. 6, 2007

(54) HIGH EFFICIENCY, HIGH SLEW RATE SWITCHING REGULATOR/AMPLIFIER

(75) Inventors: Richard Oswald, San Jose, CA (US); Tamotsu Yamamoto, Cupertino, CA (US); Takuya Ishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 106 days.

(21) Appl. No.: 11/281,878

(22) Filed: Nov. 18, 2005

(65) Prior Publication Data

US 2006/0132112 A1    Jun. 22, 2006

Related U.S. Application Data

(60) Provisional application No. 60/628,652, filed on Nov. 18, 2004.

(51) Int. Cl.
*G05F 1/59* (2006.01)

(52) U.S. Cl. .................. 323/268; 323/274; 323/284
(58) Field of Classification Search ................ 323/266, 323/268, 269, 270, 271, 272, 274, 277, 284
See application file for complete search history.

(56) References Cited

U.S. PATENT DOCUMENTS

| | | | |
|---|---|---|---|
| 4,378,530 A | 3/1983 | Garde | |
| 4,502,152 A * | 2/1985 | Sinclair | 455/73 |
| 4,727,308 A | 2/1988 | Huljak et al. | |
| 4,943,902 A | 7/1990 | Severinsky | |
| 4,959,606 A | 9/1990 | Forge | |
| 5,083,078 A * | 1/1992 | Kubler et al. | 323/268 |
| 5,258,701 A * | 11/1993 | Pizzi et al. | 323/269 |
| 5,305,192 A | 4/1994 | Bonte et al. | |
| 5,414,341 A * | 5/1995 | Brown | 323/268 |
| 5,479,090 A | 12/1995 | Schultz | |
| 5,600,234 A | 2/1997 | Hastings et al. | |
| 5,903,447 A | 5/1999 | Takahashi et al. | |
| 5,905,407 A * | 5/1999 | Midya | 330/10 |
| 5,929,620 A | 7/1999 | Dobkin et al. | |
| 5,949,229 A | 9/1999 | Choi et al. | |
| 5,982,160 A | 11/1999 | Walters et al. | |
| 6,034,517 A | 3/2000 | Schenkel | |
| 6,046,516 A | 4/2000 | Maier et al. | |
| 6,066,943 A | 5/2000 | Hastings et al. | |
| 6,166,528 A | 12/2000 | Rossetti et al. | |
| 6,222,356 B1 | 4/2001 | Taghizadeh-Kaschani | |
| 6,229,289 B1 * | 5/2001 | Piovaccari et al. | 323/268 |
| 6,249,110 B1 * | 6/2001 | Geyer et al. | 323/272 |
| 6,268,756 B1 | 7/2001 | Nayebi et al. | |
| 6,307,356 B1 | 10/2001 | Dwelley | |

(Continued)

*Primary Examiner*—Jeffrey Sterrett
(74) *Attorney, Agent, or Firm*—McDermott Will & Emery LLP

(57) ABSTRACT

A regulating apparatus having an output node and being operative for regulating the voltage level at the output node in response to a reference signal provided as an input to the regulating apparatus. The regulating apparatus includes a linear amplifier stage operative for receiving the reference signal and being capable of sourcing current to the output node when the reference signal indicates that a present voltage level at the output node is less than a desired voltage level at the output node. The regulating apparatus also includes a switching regulator, which is controlled by the linear amplifier stage, and which is operative for sourcing current to the output node when the amount of current being sourced to the output node by the linear amplifier stage exceeds a predetermined threshold.

17 Claims, 2 Drawing Sheets

U.S. PATENT DOCUMENTS

| | | |
|---|---|---|
| 6,313,610 B1 | 11/2001 | Korsunsky |
| 6,366,070 B1 | 4/2002 | Cooke et al. |
| 6,404,261 B1 | 6/2002 | Grover et al. |
| 6,476,589 B2 | 11/2002 | Umminger et al. |
| 6,486,643 B2 * | 11/2002 | Liu .............................. 323/268 |
| 6,498,466 B1 | 12/2002 | Edwards |
| 6,509,721 B1 | 1/2003 | Liebler |
| 6,522,178 B2 | 2/2003 | Dubhashi et al. |
| 6,541,947 B1 | 4/2003 | Dittmer et al. |
| 6,611,131 B2 | 8/2003 | Edwards |
| 6,636,023 B1 * | 10/2003 | Amin ......................... 323/268 |
| 6,661,210 B2 * | 12/2003 | Kimball et al. .............. 323/268 |
| 6,661,211 B1 * | 12/2003 | Currelly et al. ............. 323/268 |
| 6,724,174 B1 | 4/2004 | Esteves et al. |
| 6,744,241 B2 | 6/2004 | Feldtkeller |
| 6,828,766 B2 | 12/2004 | Corva et al. |
| 6,873,140 B2 | 3/2005 | Saggini et al. |
| 6,894,471 B2 | 5/2005 | Corva et al. |
| 7,030,596 B1 | 4/2006 | Salerno et al. |
| 7,129,681 B2 * | 10/2006 | Fujii ........................... 323/268 |
| 7,148,665 B2 * | 12/2006 | Agari et al. ................. 323/268 |
| 2003/0025484 A1 | 2/2003 | Edwards |

* cited by examiner

HIGH EFFICIENCY, HIGH SLEW RATE SWITCHING REGULATOR/AMPLIFIER

CLAIM OF PRIORITY

This patent application, and any patent(s) issuing therefrom, claims priority to U.S. provisional patent application No. 60/628,652, filed on Nov. 18, 2004, which is incorporated herein by reference in its entirety.

FIELD OF THE INVENTION

The present invention relates to an improved switching regulator and/or amplifier, and more specifically, to a novel, cost effective design for a switching regulator and/or amplifier that provides for both high efficiency and high slew rate.

BACKGROUND OF INVENTION

It has been known in the prior art to utilize switching regulators/amplifiers in applications such as, but not limited to: (1) voltage regulators utilized for supplying a relatively fixed DC voltage to a load whose current demands change very quickly such as CMOS logic processors whose activity can go from negligible (such as in standby) to very high or vise-versa in a few nanoseconds, for example, at the change of state of a control signal; and (2) "digital" amplifiers or programmable regulators where the load is relatively fixed but its voltage is changed very rapidly in response to an external command, such as DSL line drivers and supplies or modulators for communication transmitters where the power level or information signal level is changed often and abruptly over a wide dynamic range.

It is also noted that the foregoing applications are characterized by a step down operation where the supply voltage is relatively fixed or slowly varying (such as, for example, a battery), and the widely varying load current is sourced at a voltage that is either fixed or varying, but at a lower value than the supply voltage.

Prior art designs for switching regulators/amplifier to be utilized in the foregoing applications have generally included buck topology switching regulators having low value inductors, high switching frequencies and hysteretic control algorithms without loop filters to achieve high load current slew rates. As is known:

$$\left(\frac{dI}{dt} \propto \frac{Vin - Vout}{L}\right).$$

However, the use of such low value inductors results in large values of ripple current and conduction losses, while high switching frequencies result in larger switching losses, both of which undesirably lower efficiency.

In an effort to satisfy performance requirements, it has been known in the prior art to add a cascaded linear amplifier/low drop out regulator immediately before the load, even though the losses due to the load current at the required voltage overhead of the linear stage can be large. Such prior art systems are described, for example, in U.S. Pat. Nos. 4,378,530 and 5,905,407. FIG. 1 illustrates an exemplary block diagram of such a device.

Referring to FIG. 1, the device includes a programmable switching regulator 12 cascaded with a linear amplifier stage 14. In addition, the device includes overhead voltage reference supply 16, and resistors R1 and R2, which are coupled in series to one another and to the output node, $V_O$. The overhead voltage reference supply 16 causes $V_R = V_O + V_{B1}$, which is necessary for the linear amplifier to operate, as $V_R$ must be larger than $V_O$ by an "overhead voltage". Resistors R1 and R2 form a voltage divider circuit, and provide a feedback signal to the linear amplifier stage 14. The output of the linear amplifier stage 14 operating in conjunction with the output of the programmable switching regulator 12 generate the output voltage, $V_O$, of the device, which is coupled to the load (e.g., a power amplifier in a cell phone application). $V_{SUPPLY}$ corresponds to the voltage source for the device (e.g., a battery in a cell phone application), and $V_{REF}$ sets the output voltage needed to supply the power level required by the load. It is noted that in some applications, $V_{REF}$ will represent the instantaneous power requirement of the load and will include content data (e.g., voice or data information to be transmitted) which is superimposed on the $V_{REF}$ signal utilizing any suitable modulation technique. In operation, the linear amplifier stage 14 essentially functions as the power supply regulator operative to generate a substantially clean signal, $V_O$, which is representative of the instantaneous power required for the task currently at hand.

However, if the output voltage of the switching regulator cannot change rapidly enough to follow voltage changes in $V_{REF}$, then $V_R$ must be set to the instantaneous peak value of $V_O$ plus enough additional voltage margin B so that the linear amplifier does not "clip" on signal peaks. If the supply voltage, $V_{SUPPLY}$, is significantly greater than $V_R$, use of the switching regulator saves most of the power equal to $I_{LOAD} * (V_{SUPPLY} - V_R)$, which would otherwise be dissipated in the linear amplifier.

While these known prior art devices provide for an improvement in efficiency, for example, by allowing for a reduction in the switching frequency of the switching regulator, due to the requirements of today's applications and the continued demand for reducing power requirements so as to extend battery life, a further increase in the overall operating efficiency of switching regulators/amplifiers is necessary. It is an object of the present invention to satisfy these needs.

SUMMARY OF THE INVENTION

In view of the foregoing, it is a primary objective of the present invention to provide a novel switching regulator/amplifier which exhibits improved efficiency and slew rate performance relative to known prior art devices. It is also an objective of the present invention to provide a cost effective design for the novel switching regulator/amplifier so that the device represents a practical solution to the aforementioned problems.

Specifically, the present invention relates to a regulating apparatus having an output node and being operative for regulating the voltage level at the output node in response to a reference signal provided as an input to the regulating apparatus. The regulating apparatus includes a linear amplifier stage operative for receiving the reference signal and being capable of sourcing current to the output node when the reference signal indicates that the present voltage level at the output node is less than a desired voltage level at the output node. The regulating apparatus further includes a switching regulator, which is controlled by the linear amplifier stage, and which is operative for sourcing current to the output node when the amount of current being sourced to the output node by the linear amplifier stage exceeds a predetermined threshold.

The switching regulator/amplifier of the present invention provides numerous advantages over the prior art. One advantage of the present invention is that it provides a highly efficient switching regulator/amplifier that minimizes the power requirements for operation. This is accomplished in-part by reducing the power dissipated by the linear amplifier contained in the device, by providing a separate current path that is capable of providing the steady state current requirements to the load (i.e., the linear amplifier is activated only during fast changing transient voltage swings in the load). As a result, as one example, the present invention advantageously allows for an extension of battery operation time of a cell phone between charges.

In addition, the switching regulator/amplifier provides for an increased slew rate capability. As the result of the design of the present invention, which incorporates the use of a "free-wheeling" switch, it is possible to rapidly reduce the load current to substantially zero (i.e., on the order of a few nanoseconds). Moreover, when the load current is reduced in the foregoing manner, the design of the present invention does not immediately dissipate the current (i.e., as explained below the current is temporarily stored), and therefore if the load must be increased shortly after the reduction, the stored current is again coupled/provided to the load. The foregoing operation allows the switching regulator/amplifier of the present invention to exhibit both a high slew rate capability and increased operating efficiency.

Yet another advantage of the present invention is that the design provides a "feed-forward" control system in which the switching regulator/amplifier reacts to changes in the desired voltage set point when adjusting the current delivered to the load. The control of the switching regulator/amplifier does not utilize the output voltage signal. As a result, the design of the present invention further improves both slew rate performance (as the load current is adjusted more rapidly in comparison to a device that modifies the current delivered to the load based on changes in the output voltage of the regulator) and efficiency performance (as there is no sense resistor coupled to the output of device, which would result in an increase in power dissipation).

Additional objects, advantages, and novel features of the invention will become apparent to those skilled in the art upon examination of the following description, or may be learned by practice of the invention. While the novel features of the invention are set forth below, the invention, both as to organization and content, will be better understood and appreciated, along with other objects and features thereof, from the following detailed description taken in conjunction with the drawings.

BRIEF DESCRIPTION OF THE DRAWINGS

The accompanying drawings, which are incorporated into and form a part of the specification, illustrate several aspects and embodiments of the present invention and, together with the general description given above and detailed description given below, serve to explain the principles of the invention. Such description makes reference to the annexed drawings. The drawings are only for the purpose of illustrating preferred embodiments of the invention and are not to be treated as limiting the invention.

In the drawings.

Throughout the above-mentioned drawings, identical reference numerals are used to designate the same or similar component parts.

DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein: rather, these embodiments are provided so that this disclosure will be thorough and complete, and will fully convey the scope of the invention to those skilled in the art, like numbers refer to like elements throughout.

Figure 1:
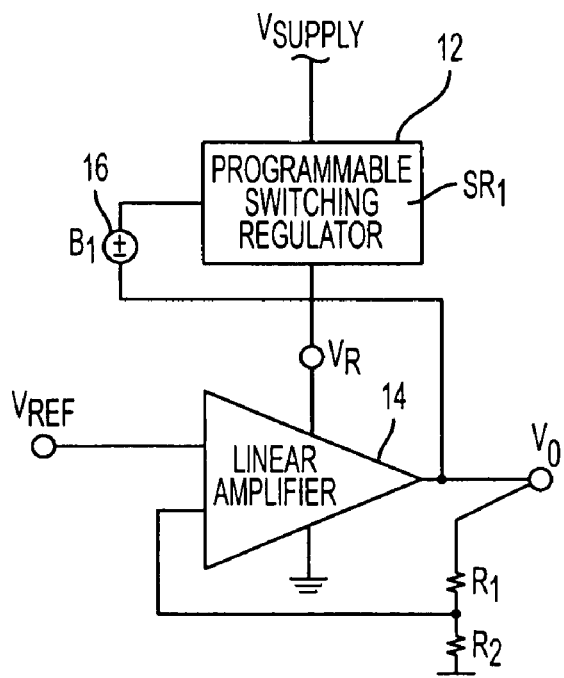
FIG. 1 illustrates a block diagram of a prior art implementation of a switching regulator/amplifier that utilizes a linear amplifier in the design.
Figure 2:
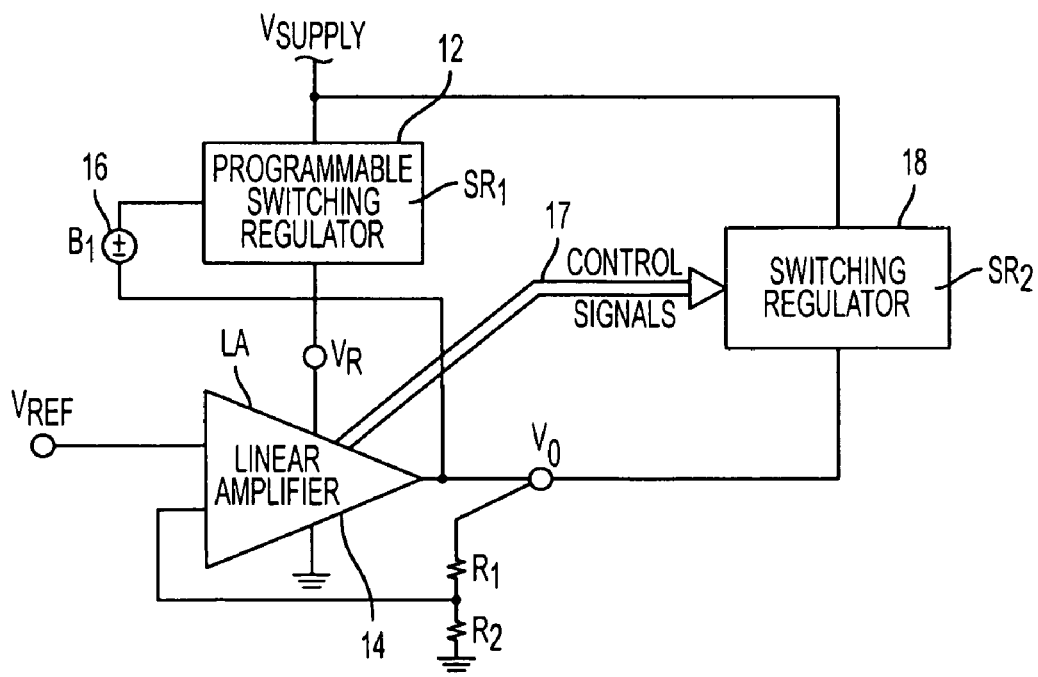
FIG. 2 illustrates an exemplary block diagram of a switching regulator/amplifier in accordance with the present invention.

Referring to FIG. 2, similar to the prior art design illustrated in FIG. 1, the switch regulator/amplifier of the present invention comprises a programmable switching regulator 12 cascaded with a linear amplifier stage 14, as well an overhead voltage supply 16 and resistors R1 and R2. The linear amplifier stage 14 receives $V_{REF}$ as an input signal. The foregoing components are coupled together in the same manner as illustrated in FIG. 1. However, the design also includes a second switching regulator 18 coupled between the supply voltage $V_{SUPPLY}$ and the output, $V_O$, as shown in FIG. 2. $V_R$ is the minimum supply voltage for the linear amplifier that allows it to follow the signal peaks of $V_{REF}$ without clipping. The linear amplifier stage 14 provides control signals 17 to the second switching regulator 18, which govern the operation of the second switch regulator 18.

As explained in more detail below, the inclusion of the second switching regulator 18 disposed between the power supply, $V_{SUPPLY}$, and the load, $V_O$, provides for a second current path so as to allow for the steady state current (or slowly changing current) required by the load to be delivered to the load via the second switching regulator 18 without accessing/utilizing the linear amplifier stage 14. In the present invention, the linear amplifier stage 14 is primarily utilized to deliver fast changing (i.e., transient) current requirements to the load. As a result of this design, the utilization of the linear amplifier stage 14, which exhibits low efficiency and high power dissipation, is minimized thereby increasing the overall efficiency of the device.

Figure 3:
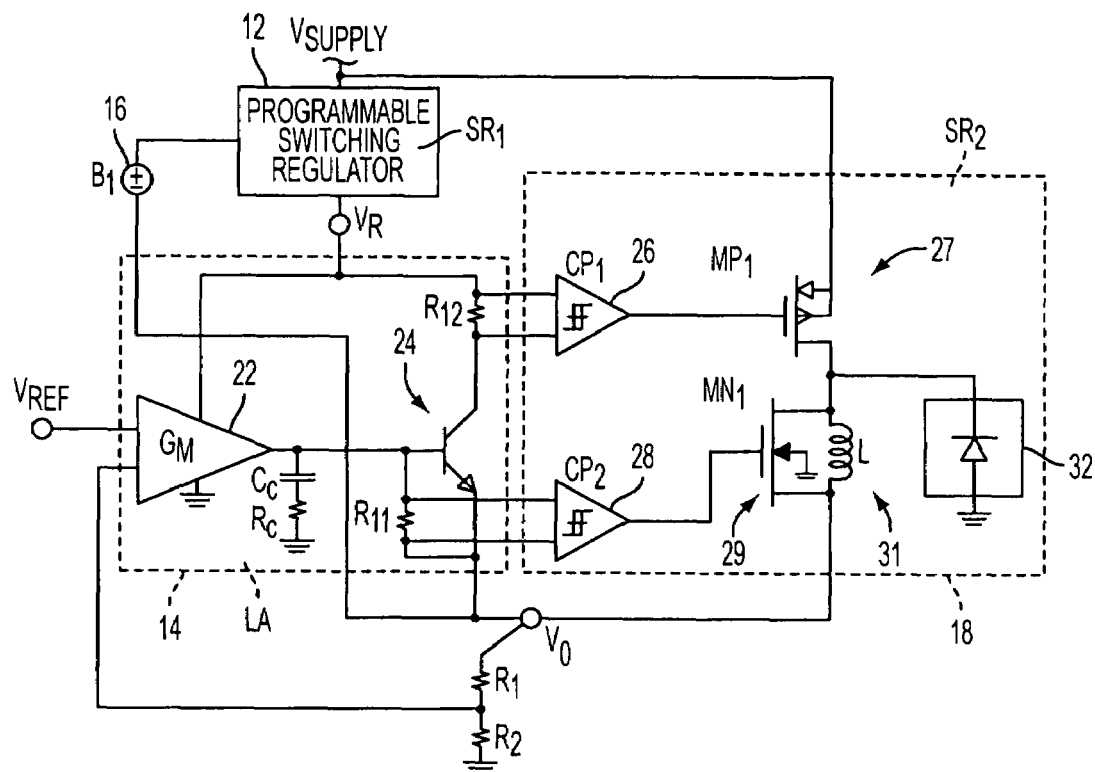
FIG. 3 illustrates a schematic diagram of an exemplary implementation of the switching regulator/amplifier of the present invention.

FIG. 3 illustrates a schematic diagram of an exemplary implementation of the switching regulator/amplifier illustrated in FIG. 2. It is noted that the present invention is not limited to the specific embodiment disclosed in FIG. 3, as variations to the particular design are clearly possible.

Referring to FIG. 3, the programmable switching regulator 12 receives $V_{SUPPLY}$ as an input voltage and generates an output voltage signal $V_R$. In addition, overhead voltage reference supply 16 is coupled to the programmable switching regulator 12. It is noted that the programmable switching regulator 12 furnishes an output voltage, $V_R$, which is equal to the average value of the linear amplifier output voltage, $V_O$, plus an additional voltage $V_{B1}$, where $V_{B1}$ equals the peak to average value of $V_O$ and a small additional voltage necessary to assure that linear amplifier 14 does not clip (i.e., voltage saturate) on peaks of the $V_{REF}$ signal. As such, the programmable switching regulator 12 need only have a response time fast enough to follow the average value of $V_O$ and not its instantaneous value or envelope.

More specifically, the output voltage, $V_R$, of the programmable switching regulator follows the value of its input reference voltage, $(V_O+V_B)$, within the capability of its control bandwidth or response time as set forth by its internal clock or switching frequency. Thus, the voltage $V_R$ follows the average value of $V_O$ plus the additional voltage of $V_{B1}$, where the averaging period is set by the control bandwidth of the programmable switching regulator or may be adjusted to a specific value by adding an additional low pass filter in its control input line. The choice of averaging period and value of $V_R$ are selected to match the characteristics of the $V_{REF}$ signal and linear amplifier response such that the value of $V_{B1}$ is equal to the maximum value of $V_O$ average to positive peak value during any sliding time averaging period as a window. The objective is to minimize the value of $V_{B1}$ to the smallest value of the average to peak during the response time of the switching regulator so that most of the voltage difference between $V_{SUPPLY}$ and $V_O$ can be absorbed by the switching regulator at typically 90% efficiency rather than be wasted as voltage drop across the linear amplifier. Thus, by choosing an appropriate $V_{B1}$ to match the AC signal characteristics of $V_O$ (and therefore $V_{REF}$ when not distorting) and the response time of the switching regulator, essentially any programmable switching regulator response time and signal characteristic of $V_O$ can be accommodated. However, it is noted that if the switching regulator response is too slow relative to the rate of change of the $V_{REF}$ signal, efficiency improvements from use of the programmable switching regulator may be small and overall system efficiency inadequate.

Continuing, in the given embodiment the linear amplifier stage 14 includes an error amplifier 22, a linear amplifier 24 comprising an NPN transistor, resistor R11 coupled between the base and emitter terminals of the linear amplifier 24, resistor R12 coupled to the collector of the linear amplifier 24, and capacitor Cc and resistor Rc connected in series and coupled to the output of the error amplifier 22. The emitter of the linear amplifier 24 is coupled to the load, $V_O$. As shown in FIG. 3, the output signal, $V_R$, of the programmable switching regulator 12 is coupled to both resistor R12 and the error amplifier 22 and functions as the amplifier supply voltage. In operation, the error amplifier 22 and the linear amplifier 24 form a linear amplifier/regulator that has sufficient bandwidth to allow the output, $V_O$, to follow the reference $V_{REF}$ in the presence of rapid time variations in $V_{REF}$ and/or the load current. As shown, a portion of the output signal, $V_O$, is fed-back to the input of the error amplifier 22 so as to allow the error amplifier to generate an output signal indicative of the difference between the desired output voltage level and the actual output voltage level, and cause $V_O$ to follow $(V_{REF}*(R1+R2)/R2)$.

Referring again to FIG. 3, in the given embodiment, the second switching regulator 18 comprises a first comparator 26 having a first input and a second input which are coupled across resistor R12, and a second comparator 28 having a first input and a second input which are coupled across resistor R11. The second switching regulator 18 further includes a first switch 27, which is a pMOS device, a second switch 29, which is an nMOS device, an inductor 31 and an active diode 32. As shown, the output of the first comparator 26 is coupled to the first switch 27, which has a source terminal coupled to the supply voltage, $V_{SUPPLY}$. The output of the second comparator 28 is coupled to the gate of the second switch 29. It is noted that the inductor 31 is coupled between the source and drain terminals of the second switch 29, and the body of the second switch 29 is not connected to either its source or drain, but rather to ground as shown in FIG. 3. The inductor 31 is also coupled between the drain terminal of the first switch 27 and the load, $V_O$. It is further noted that the drain terminal of the first switch 27 and the source terminal of second switch 29 are coupled together and are also coupled to diode 32. In the preferred embodiment, the diode 32 is an "active" type diode comprising a comparator and NMOS transistor as described in pending application Ser. No. 11/094,369 filed Mar. 31, 2005, which is hereby incorporated by reference in its entirety.

Turning to the operation of the device as a system, it is noted that without the second switching regulator 18 in the device, the entire load current would have to pass through the linear amplifier stage 14, and as a result the power dissipation due to the load current times the overhead voltage $B_1$ required for proper operation would greatly reduce the efficiency of the device. However, by including the second switching regulator 18, which has minimal switching and conduction losses, most of the load current passes through the second switching regulator 18 and therefore bypasses the linear amplifier stage 14, thereby greatly improving overall efficiency. It is noted, however, that the linear path is always present and can supply the entire incremental load current during transients.

At initial turn of the power supply, $V_{SUPPLY}$, with $V_{REF}$ already having a desired value and $V_{B1}$ set appropriately as described earlier, $V_O$ is zero and the input to the programmable switching regulator is $V_{B1}$. The programmable switching regulator output voltage $V_R$ rises toward $(V_O+V_{B1})$ at a rate set by its inherent response time, and the linear regulator now has a non-zero supply voltage, and so long as $V_O<(V_{REF}*(R1+R2)/R2)$, it continues to increase $V_O$ toward $V_R$, and therefore the output voltage $V_O$ thus ramps up at a rate set by the slew rate of the programmable switching regulator. When $V_O=(V_{REF}*(R1+R2)/R2)$, $V_O$ has reached steady state and its stays at that voltage until the programmable switching regulator output, $V_R$, has reached $[(V_{REF}*(R1+R2)/R2)+V_{B1}]$, at which point it remains static unless or until $V_{REF}$ changes. Thus, power on requires no special function within the device design, and the operation of the second switching regulator will be the same as described in the following for all modes of operation including start up.

Continuing, during operation, if the second switching regulator 18 off, the load current flows through the linear amplifier stage 14 including the linear amplifier 24. This results in an increase in the voltage drop across R12, which if greater than the upper threshold of the first comparator 26, results in the turn on of first switch 27 and therefore the supply of current to the load, $V_O$, through the inductor 31. As the inductor current increases, the current in the linear amplifier 24 decreases because their sum is the present load current. This reduces the voltage drop across R12 until such time that the reduction in voltage across R12 causes it to become less than the lower threshold of the first comparator 26 and turns off the first switch 27, thereby preventing further current from being supplied to the load from $V_{SUPPLY}$. Thus, at steady state, the comparator 26 switches on and off at some duty cycle, and most of the load current flows through the inductor 31, and consists of a DC component and an AC triangular component. The sum of the DC component and AC component of the inductor current and the linear amplifier current equals the load current. Thus, the linear amplifier AC current is 180 degrees out of phase with the AC component of the inductor current and there is no AC voltage ripple present at the load, $V_O$.

The switching frequency of the second switching regulator 18 is set by the relationship between $V_{SUPPLY}$-$V_O$, the value of the inductor 31, the value of hysteresis set by the first comparator 26 and the voltage drop from the current through resistor R12. It is noted that when the first switch 27 is off, inductor current flows through the diode 32, which as noted above is preferably of the "active" type, and therefore has a forward voltage drop that is negligible with respect to $V_O$. The actual values utilized for the various components are typically based on the specific application for which the device will be utilized n conjunction with well known design relationships.

From the foregoing discussion, it is clear that the circuit of the present invention is capable of handling steady state and increasing load current exceedingly well. However, the circuit is also capable of handling rapidly decreasing load currents, and does so in a manner which provides for both high slew rates and improved efficiency. In operation, during transients when the inductor current is larger than the load current, the linear amplifier stage 14 starts to turn off when the voltage across R11 becomes less than $V_{BE}$ of linear amplifier 24, thereby turning off linear amplifier 24. The value of R11 is part of the amplifier design and the threshold of comparator 28 should be about $0.8*V_{BE}$ with a few millivolts of hysteresis to avoid noise effects. At this time, the second comparator 28 turns on the second switch 29, which allows the inductor current to recirculate and slowly decay in value without being passed into the load, $V_O$. Specifically, the inductor current recirculates in an autonomous loop formed by the inductor 31 and the second switch 29 (which is referred to herein as a free-wheeling switch). Thus, the foregoing configuration allows the load current to be rapidly reduced to substantially zero on the order of a few nanoseconds. In other words, the device allows the total current sourced by the overall regulator/amplifier to go to nearly zero during transients even though the linear amplifier stage 14 can only source current, and prevents voltage overshoots in most any dissipative load without degrading efficiency. Further, as $V_O$ is not used to control the second switching regulator 18, it has no ripple voltage and can precisely track $V_{REF}$.

It is further noted that by utilizing the "free-wheeling" switch 29 in the device of the present invention, when the load current is reduced in the foregoing manner, the device of the present invention does not immediately dissipate the current (i.e., the current is temporarily stored in the inductor and autonomous loop). As such, if the load current must be increased shortly after the reduction, the stored current is again coupled to the load. This would occur upon deactivation of the second switch 29, which occurs when the linear amplifier stage 14 becomes active again (i.e., $V_{REF}$ indicates a desired increase in load voltage) and the voltage across R11 is greater than the trip point of the second comparator 28. This operation of not dissipating the inductor current and allowing for the reuse of the stored inductor current allows the switching regulator/amplifier of the present invention to exhibit high slew rates and increased efficiency.

It is also noted that by sensing the collector current of linear amplifier 24 instead of the output current of the linear amplifier stage 14, the output impedance of the linear amplifier stage 14 is advantageously not increased by a sensing resistor. Furthermore, the value of R11 can be relatively large so that a small current threshold of the second comparator 28 can be achieved with minimal error due to the voltage offset of the second comparator 28.

While an exemplary embodiment of the present invention is set forth above in FIG. 3 is it noted that the present invention is not intended to be limited to the disclosed embodiments as various implementations of the device are clearly possible. For example, FIGS. 4 and 5 illustrate alternative embodiments of the output stage of the linear amplifier 24.

Figure 4:
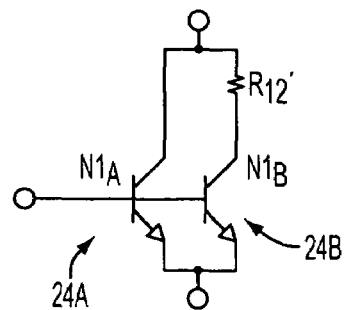
FIG. 4 illustrates a first alternative embodiment of the output stage of the linear amplifier stage.
Figure 5:
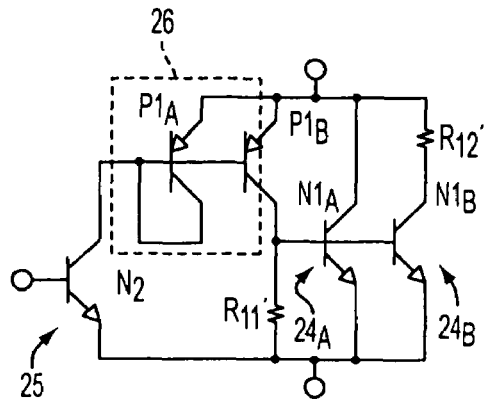
FIG. 5 illustrates a second alternative embodiment of the output stage of the linear amplifier stage.

More specifically, in a first variation, the linear amplifier 24 can comprise two matched parallel transistors 24A and 24B, as shown in FIG. 4, where the emitter area of $24_A$, is $K*$ (area of $24_B$) and $R_2$ is $K*R_2$. Thus, with K large, $R_2$ can be sized more conveniently but still maintain the threshold of the first comparator 26 the same with respect to the total collector current of linear amplifier 24 of FIG. 3, and the total current gain of the linear amplifier 24 will not change appreciably even if transistor $24_B$ voltage saturates. In a second variation, an additional linear amplifier stage consisting of transistor 25 and mirror 26 also could be added to linear amplifier 24, as shown in FIG. 5, to further lower the output impedance of the linear amplifier and make its frequency compensation easier without changing the operating voltages from those of the configuration shown in FIG. 3 or 4. It is noted that if utilizing the alternative embodiments for the linear amplifier 24, in addition to the linear amplifier, the resistor R12 would be replaced by the circuit shown in FIGS. 4 and 5, and the inputs of the first comparator would be coupled across R12'. In FIG. 5, the inputs of the second comparator would be coupled across resistor R11'.

As noted above, the switching regulator/amplifier of the present invention provides numerous advantages over the prior art. One advantage of the present invention is that it provides a highly efficient switching regulator/amplifier that minimizes the power requirements for operation. This is accomplished in-part by reducing the power dissipated by the linear amplifier contained in the device, by providing a separate current path that is capable of providing the steady state current requirements to the load (i.e., the linear amplifier is activated only during fast changing transient voltage swings in the load). As a result, as one example, the present invention advantageously allows for an extension of battery operation time of a cell phone between charges.

Another advantage is that the switching regulator/amplifier of the present invention provides for an increased slew rate capability. As the result of the present invention, which incorporates the use of a "free-wheeling" switch, it is possible to rapidly reduce the load current to substantially zero (i.e., on the order of a few nanoseconds). Moreover, when the load current is reduced in the foregoing manner, the design of the present invention does not immediately dissipate the current (i.e., as explained above the current is temporarily stored), and therefore if the load must be increased shortly after the reduction, the stored current is again coupled to the load. The foregoing operation allows the switching regulator/amplifier of the present invention to exhibit high slew rate capabilities and improved efficiency.

Yet another advantage of the present invention is that the design provides a "feed-forward" control system in which the switching regulator/amplifier reacts to changes in the desired voltage set point when adjusting the current delivered to the load. The control of the switching regulator/amplifier does not utilize the output voltage signal. As a result, the design of the present invention further improves both slew rate performance (as the load current is adjusted more rapidly in comparison to a device that modifies the current delivered to the load based on changes in the output voltage of the regulator) and efficiency performance (as there is no sense resistor coupled to the output of device, which would result in an increase in power dissipation).

While specific embodiments of, and examples for, the invention are described herein for illustrative purposes, various equivalent modifications are possible within the scope of the invention, as those skilled in the relevant art will recognize.

For example, it is noted that the programmable switching regulator 12 operates to maintain $V_R - V_O$ greater than the linear stage drop out voltage even if the short term voltage slew of $V_O$ exceeds $V_R$, by choosing voltage offset $B_1$ appropriately. This is necessary to maintain efficiency if the $V_{SUPPLY} - V_O$ voltage differential is much larger than the dropout voltage of the linear regulator. In the event that the $V_{SUPPLY} - V_O$ voltage differential is not larger than the dropout voltage of the linear regulator, it is possible to omit the programmable switching regulator from the design.

The aforementioned variations are merely examples. Further, the terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A regulating apparatus having an output node and being operative for regulating the voltage at said output node with respect to a common node to a desired value set by a reference signal provided to said regulating apparatus, said regulating apparatus comprising:

a linear amplifier stage operative for receiving said reference signal and being capable of sourcing current to said output node when a present voltage level at said output node is less than a desired voltage level at said output node set by said reference signal; and a switching circuit comprising a first semiconductor switch connected between a power supply and a first node, a diode whose cathode is connected to said first node and whose anode is connected to said common node, an inductor having one terminal connected to said first node and another terminal connected to said output node, a second semiconductor switch connected in parallel with said inductor;

where said first and second semiconductor switches are controlled by signals generated by the linear amplifier stage.

2. The regulating apparatus of claim 1, wherein when said second semiconductor switch is activated, said second semiconductor switch and said inductor form a closed circuit such that the current stored in said inductor recirculates through said second semiconductor switch, and when said second semiconductor switch is deactivated said inductor is capable of delivering current to said output node.

3. The regulating apparatus according to claim 1, wherein said linear amplifier stage comprises:

an error amplifier for receiving said reference signal and for generating an output signal indicative of the difference between said reference and said voltage level at said output node;

a linear amplifier coupled to said error amplifier so as to receive said output signal of said error amplifier, said linear amplifier being controlled by said output signal of said error amplifier; and means for measuring current flowing into said linear amplifier from a power supply input terminal, whereby said means for measuring current does not increase the output impedance of said linear amplifier.

4. The regulating apparatus of claim 3, wherein said signal controlling said second semiconductor switch is generated within said linear amplifier stage by a second comparator which monitors said output signal of said error amplifier and turns on said second semiconductor switch when the magnitude of the input signal to said second comparator falls below a predetermined level.

5. The regulating apparatus of claim 4, wherein said second comparator exhibits a hysteretic characteristic with respect to the changing of its output state.

6. The regulating apparatus of claim 3, wherein the control for said first semiconductor switch is generated within said linear amplifier stage by a first comparator which monitors the output of said means for measuring current and turns on said first semiconductor switch when the magnitude of the input signal in said first comparator exceeds a predetermined value.

7. The regulating apparatus of claim 6, wherein said first comparator exhibits a hysteretic characteristic with respect to the changing of its output state.

8. The regulating apparatus of claim 3, wherein said linear amplifier comprises an NPN transistor.

9. The regulating apparatus according to claim 3, wherein an output stage of said linear amplifier comprises a first transistor and a second transistor, which are coupled to one another in a parallel configuration.

10. The regulating apparatus according to claim 9, wherein the area of an emitter of said first transistor and the area of an emitter of said second transistor are different from each other.

11. The regulating apparatus according to claim 9, wherein said output stage of said linear amplifier further comprises a transistor and a current mirror, wherein said transistor receives the output signal of said error amplifier as an input signal, said transistor having an output signal coupled to an input of said current mirror, said current mirror having an output coupled to an input of said first and second transistors coupled in parallel.

12. The regulating apparatus of claim 1, wherein said first semiconductor switch comprises a PMOS transistor, and said second semiconductor switch comprises an NMOS transistor, said NMOS transistor having a body terminal coupled to said common node.

13. The regulating apparatus of claim 1, wherein said diode comprises an active diode.

14. The regulating apparatus of claim 1, further comprising a programmable output switching regulator having an output voltage signal, which is coupled to said linear amplifier stage and which operates as a supply voltage to said linear amplifier stage;

wherein said output voltage signal of said programmable output switching regulator equals an average of the value of the voltage signal input into said programmable output switching regulator.

15. The regulating apparatus according to claim 14, wherein said voltage input into said programmable output switching regulator equals the sum of the voltage output by said linear amplifier stage and a reference voltage.

16. The regulating apparatus according to claim 15, wherein said programmable output switching regulator is operable for reducing power dissipation in said linear amplifier stage when the value of the voltage output by said linear amplifier stage plus said reference voltage is less than the value of a supply voltage.

17. The regulating apparatus according to claim 15, wherein said programmable output switching regulator is operable for preventing the output of said linear amplifier stage from clipping.

* * * * *